UNITED STATES PATENT OFFICE.

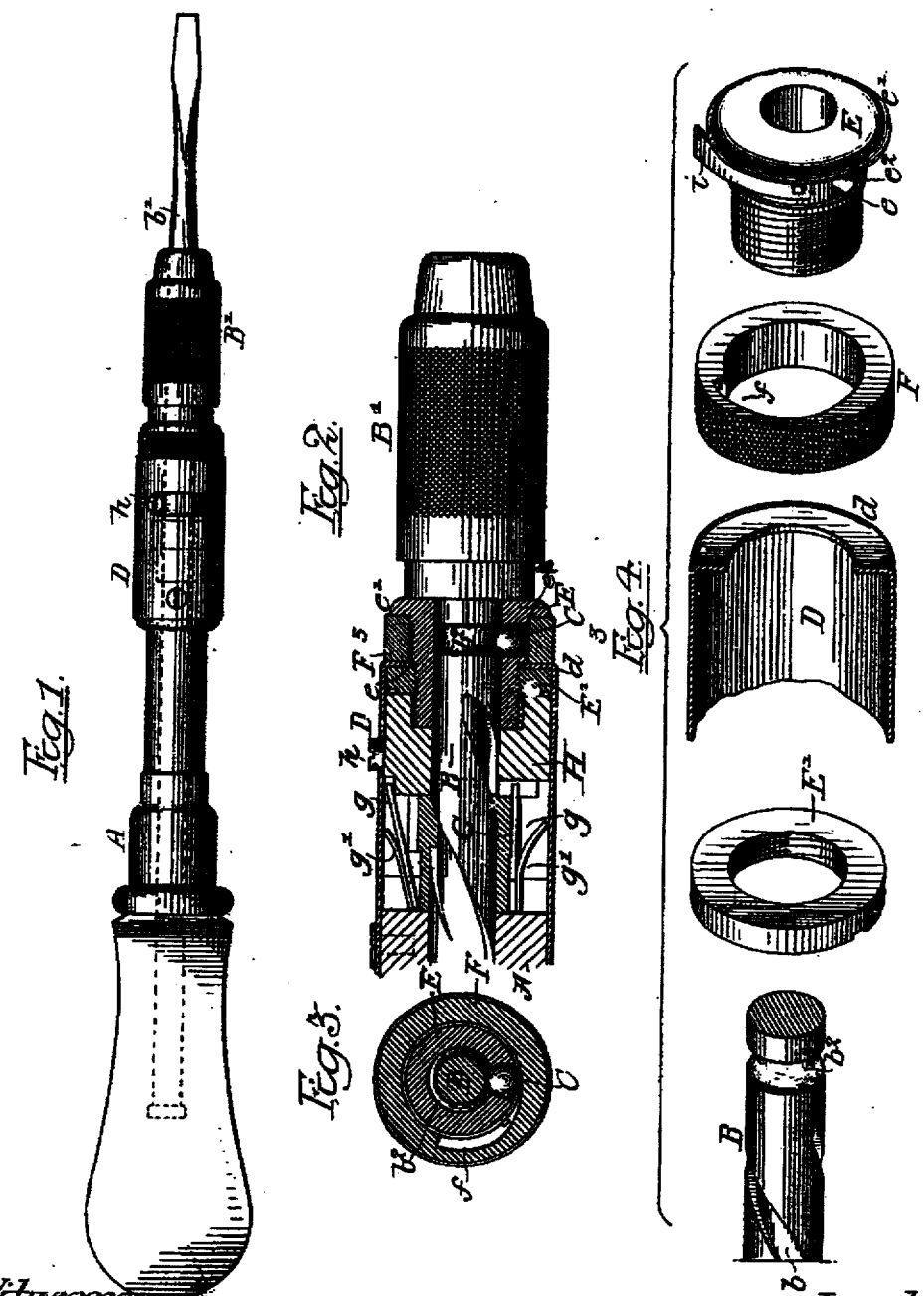

ZACHRY T. FURBISH, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

LOCKING MECHANISM FOR RATCHET SCREW-DRIVERS.

No. 902,957.   Specification of Letters Patent.   Patented Nov. 3, 1908.

Application filed December 31, 1902. Serial No. 137,259.

*To all whom it may concern:*

Be it known that I, ZACHRY T. FURBISH, a citizen of the United States, residing in Philadelphia, Pennsylvania, have invented certain Improvements in Locking Mechanism for Ratchet Screw-Drivers, of which the following is a specification.

The object of my invention is to prevent the stock or handle of a push driver or drill moving longitudinally on the spindle when the tool is used only as a ratchet tool. This object I attain in the following manner, reference being had to the accompanying drawing, in which:—

Figure 1, is a side view of my improved tool; Fig. 2, is an enlarged sectional view of part of Fig. 1; Fig. 3, is a section on the line 3—3, Fig. 2; and Fig. 4, is a perspective view of the parts detached.

A is the stock portion of my improved tool within which is a spindle B, having one or more spiral grooves $b$ therein. On the end of the spindle is a chuck B' of any suitable type for securing the bit $b'$ to the spindle; this bit may be in the form of a screw driver, drill or other tool.

Mounted on the stock A is a shell D inclosing the ratchet mechanism, consisting, in the present instance, of a ratchet wheel G having a spline which enters the spiral groove $b$ in the spindle B. Two pawls $g$ $g$ are pivoted to the stock A and are arranged to engage the teeth of the wheel G, springs $g'$, $g'$ keep the teeth in engagement with the wheel when they are not forced out by the cam $h'$ on the shifter H which has a pin $h$ extending through a slot in the shell D. By moving the shifter H to the right or left one or other of the pawls can be thrown out of engagement with the wheel G. This ratchet mechanism is the mechanism commonly used by me on this type of tool and is covered by Letters Patent, No. 593,157, granted to me on the 2nd day of November, 1897, and No. 666,508, granted to me on the 22nd day of January, 1901, and therefore I lay no claim to it in this application. The ratchet mechanism may be modified without departing from my invention.

E is a clutch carried, in the present instance, by the stock, this clutch is arranged to engage the spindle so as to lock the stock against longitudinal movement on the spindle, as shown in the drawing the clutch E consists of a cap E' which extends into the end of the shell and is reduced to form a shoulder $e$ between which and a nut $E^2$ on the threaded portion of the cap is held the flange $d$ of the shell D.

In the cap E' is a recess $e^2$ for a ball C which can be projected, by any suitable means, into an annular groove or recess $b^2$ in the outer end of the spindle B to lock the stock against longitudinal movement on the spindle. The annular groove allowing the stock to freely turn on the spindle but the stock can be locked entirely by throwing both pawls $g$, $g$ in gear with the ratchet wheel G.

In the present instance I mount a ring F between the flange $d$ of the shell and a flange $e'$ on the cap E', said ring has a recess $f$, shown in Figs. 2 and 4, which, when opposite the recess $e^2$, allows the ball to free itself of the spindle and the operator can reciprocate the stock, but when the ball is in line with the groove $b^2$ and the ring is turned it will force the ball into the groove and hold it there, forming a positive clutch locking the stock against longitudinal movement. A spring $i$ attached to the cap E' bears against the inner surface of the ring and places friction upon it to such an extent that it can not turn freely but will remain in the position to which it is adjusted.

It will be understood that a roller or any equivalent of the ball may be used in some instances, without departing from my invention, which is broadly to provide a clutch for locking the stock against longitudinal movement on the spindle.

When the stock is not locked to the spindle the tool can be used as a push driver or drill, but when the stock is locked to the spindle by the clutch it can be turned in either direction, and the spindle B with its tool can be turned in one direction through the medium of the ratchet mechanism, the tool will then act the same as a simple ratchet tool.

I claim as my invention:—

1. The combination of a stock, a tool spindle, ratchet mechanism by which the tool spindle can be rotated on reciprocating the stock, said tool spindle having an annular groove in its outer end, clutch mechanism carried by the stock and having an element arranged to enter the annular groove in the spindle to lock the stock against longitudinal movement on the spindle, substantially as described.

2. The combination of a stock, a tool spindle, ratchet mechanism by which the tool spindle can be rotated on reciprocating the stock, said tool spindle having a recess in one end, a cavity in the stock, a ball mounted in the cavity, and a sleeve shaped to force the ball into the recess in the spindle to lock the stock against longitudinal movement on the spindle, substantially as described.

3. The combination in a ratchet tool, of a spindle having a groove therein, a stock, a cap therefor, ratchet mechanism carried by the stock and arranged to turn the spindle as the stock is reciprocated, a ball mounted in the cap on the stock, a movable ring recessed to receive the ball, said ring being formed to retain the ball in the groove to lock the spindle to the stock when in one position and to permit the ball to pass out of said groove when in another position, substantially as described.

4. The combination in a ratchet tool, of a stock, a spindle, a cap having a threaded portion, a nut on the threaded portion, a shell provided with a flange whereby it is held in position by said nut, said cap having an opening and a ball mounted therein, a ring carried by the cap and the shell, said ring having a recess for receiving the ball when the latter is out of action, substantially as described.

5. The combination of a stock, a tool spindle, ratchet mechanism by which the spindle can be rotated on reciprocating the stock, a ball carried by the stock arranged to enter a recess in the spindle, a recessed ring for forcing the ball into the recess of the spindle, and a spring for placing friction upon the ring so that it will remain in its adjusted position, substantially as described.

In testimony whereof, I have signed my name to this specification, in the presence of two subscribing witnesses.

ZACHRY T. FURBISH.

Witnesses:
WILL. A. BARR,
JOS. H. KLEIN.